(12) United States Patent
Dümler et al.

(10) Patent No.: US 6,632,255 B2
(45) Date of Patent: Oct. 14, 2003

(54) GRANULAR COMPACTS

(75) Inventors: Walter Dümler, Bad Bellingen (DE); Paolo Balliello, Rheinfelden (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 54 days.

(21) Appl. No.: 09/932,733

(22) Filed: Aug. 17, 2001

(65) Prior Publication Data

US 2002/0032939 A1 Mar. 21, 2002

(51) Int. Cl.$^7$ ............................................. C09B 67/00
(52) U.S. Cl. .................. 8/552; 8/526; 8/576; 8/577
(58) Field of Search ..................... 8/526, 552, 576, 8/597

(56) References Cited

U.S. PATENT DOCUMENTS

| | | | |
|---|---|---|---|
| 3,034,848 A | 5/1962 | King ........................ 8/79 |
| 4,465,491 A | 8/1984 | Balliello et al. ............ 8/524 |
| 4,560,747 A | 12/1985 | Bruttel et al. ............. 534/887 |
| 4,820,311 A | * 4/1989 | Tempel | |
| 4,846,409 A | 7/1989 | Kaspar et al. ............. 241/21 |
| 5,507,991 A | 4/1996 | Mudd ..................... 264/143 |

FOREIGN PATENT DOCUMENTS

| | | |
|---|---|---|
| DE | 3910275 | 10/1990 |
| GB | 1509965 | 5/1978 |
| WO | 99/05226 | 2/1999 |

OTHER PUBLICATIONS

Abstract for FR 2645164 (1990).
Abstract for FR 2373591 (1981).
Abstract for CH 492007 (1970).
Abstract for EP 0115634 (1984).
Abstract for FR 2387270 (1980).
Abstract for DE 3248504 (1983).
Abstract for DE 3910275 (1990).

* cited by examiner

*Primary Examiner*—Margaret Einsmann
(74) *Attorney, Agent, or Firm*—Kevin T. Mansfield

(57) ABSTRACT

The invention relates to the compacted granular products of a mixture of (A) at least one water-soluble dye,
(B) at least one extender, and
(C) at least one compound of formula:

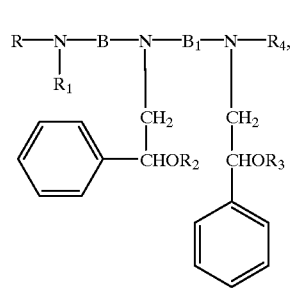

(1)

wherein

R is a saturated or unsaturated aliphatic residue with 12 to 22 carbon atoms, $R_1$, $R_2$, $R_3$ and $R_4$ independently of one another are each hydrogen or a residue of formula—$(OCH_2CH_2)_nH$ in which n is a number from 20 to 100, and B and $B_1$ independently of one another are each $C_1$–$C_4$alkylene, and optionally (D) a dust-binding oil and/or (E) further additives, their production and their use.

12 Claims, No Drawings

GRANULAR COMPACTS

For the selling of dyes, these substances are commonly formulated to specific concentrations of active substance and in a most readily usable form. Water-soluble dyes can be formulated, for example, in liquid form as concentrated solutions or dispersions, which offers certain advantages in terms of the metering of the products but which on the other hand entails the handling of a large amount of liquid on transportation and storage, which not only occupies transport and storage volume but also, should the containers suffer any damage and the liquid formulation run out, leads to the corresponding consequences. In order to avoid these problems as far as possible, the said water-soluble dyes can be formulated also as dry products, for example as powders, granules or shaped compacts (tabletted/briquetted or spherical/pelletized). The pulverulent products are often not sufficiently free-flowing and/or tend strongly towards dusting and, occasionally, to accretion as well, which when the containers are handled and the products are used to prepare the corresponding dyeing baths may lead to corresponding instances of contamination and product loss. To reduce these disadvantages granules have been prepared, principally hollow spheres (via atomizer) or built-up granules, especially fluidized-bed granules. Although there is less dusting with these granules, the mutual abrasion of the individual particles or the bursting of the hollow spheres in the course, for example, of transportation, transfer, etc., may likewise result in powder or dust, so that again when handling the products a certain level of dusting may be caused and/or downwards-flowing abraded powder accumulates in the bottom part of the container and, consequently, the consistency of the product in the container as a whole is not uniform. Fluidized-bed granules, although they do not share with the hollow spheres the disadvantage that they may burst, are fairly laborious to prepare: for the preparation of the fluidized-bed granules the products along with at least a portion of the additives must be admixed with water and then dried in a fluidized-bed granulator, which may have an adverse effect on thermally unstable products as a result, for example, of the heating, and may in addition be disadvantageous for those products which may become tacky under such conditions. Owing to the relatively large amount of voids in the individual grain of the structured granules, a fairly large proportion of any dustproofing agent added penetrates into the voids before an effective amount thereof is present on the exterior surface of the granule. If to circumvent these problems the dyes are then formed as coarsely granular compacts (briquettes or pellets, with a size, for example, of from 3 to 10 mm) there may occur the disadvantage of a reduced and irregular rate of dissolution of the active substance in the compacts, with the additional possibility again of powder and dust forming in the packaged dye as a result of capping of the particles.

In EP-A-0115634 and in EP-A-0612537 there are described certain machines, with which dry products, e.g. dyes may be sprayed with dedusting agents. In EP-A-0115634 is described the treatment of abrasion sensitive products, e.g. of spray dried dyes or of dyestuff hollow beads, in a turning tubular mixer; in EP-A-0612537 is described the treatment of fine particle size solids, among else of dyestuff powders and granules, with a liquid, e.g. a dedusting agent, in a mixer provided with an ultrasonic atomizer.

In EP-A-0028379 and 0264049, FR-A-2387270 and DE-A-3248504 is described the production of water soluble granules by build-up granulation. In FR-A-2387270 (=DE-A-2716478) and in DE-A-3248504 there are described fluidized-bed granulators. In EP-A-0028379 is described the production of fluidized-bed granules by employing certain granulating adjuvants. In EP-A-0264049 is described a multiple stage production of dye build-up granules by mixing-granulation and fluidized-bed drying, while in the introduction of this EP there are indicated some disadvantages of fluidized-bed granulation (such as prolonged permanence and—for the production of high tonnage—large, costly machines).

In U.S. Pat. No. 5,507,991 is described the production of extrudates from a water/dye mixture (produced by mixing spray dried FD&C dye with water), where after extrusion a drying—e.g. during several hours in an oven at 90 to 130° C.—is required in order to eliminate again the added water; such extrudates, due to their elongated (mostly cylindrical) shape or/and due to the porosity resulting by the water evaporation in drying, are however not particularly stable, and in transportation and transfer they may break rather easily and consequently dust is also formed. In this U.S. Pat. No. 5,507,991 in the introduction (column 2, lines 55–60) there is also indicated that compaction and granulation products are highly vulnerable to the effects of abrasion and disintegration, which means that they would not be usable in practice. From FR- A-2645164 is known an extrusion of nearly dry product, in which before extrusion a dedusting agent is also admixed; these extrudates are however of a less dense packing and consequently are also less stable and tend still more to breaking in moving (transportation, transfer from one vessel to another).

In FR-A-2373591 is described the production of dye powders of low dust content by admixture of an adhesive, a dust agglomerating agent and a preheated salt and of further additions, where there is also incidentally mentioned that the produced dye compositions may optionally be compacted.

In U.S. Pat. No. 3,034,848 there is described the compaction of certain dyes which are soluble in gasoline but not soluble in water.

From CH-A-492007 it is known to mix dyestuff powder in the presence of ice shivers and of a binder, by which there are obtained non-compacted crumby products of very fine particle size; this physical form is aimed at in order to achieve a sufficient solubility and speed of dissolution, while the production of larger sized particles, such as granules, briquettes and tablets, is designated as being of disadvantage due to their bad solubility in water and their properties deviating from those of the starting products (column 1, lines 25–30).

In DE-A-3248504 there is described a process for the production of fluidized-bed granules of water soluble substances, among else of dyes, and the introduction of the description (page 3, 2nd paragraph) advises against particles with a hard surface (these comprise for instance the above mentioned tablets and briquettes, but also in general further compaction or extrusion products) because these dissolve very badly, so that the required speed of dissolution is not achieved.

In WO 99/05226 compacted granular products containing water-soluble dye or optical brightener are described, which, however are not completely satisfactory with regard to their stability, especially after repeated transportation or storage for a longer period of time.

There is therefore a need for a dye formulation, which does not have these drawbacks.

It has now, surprisingly and despite the above mentioned prejudices, been found that granules of water-soluble dyes, obtainable by dry compaction (densification), especially by means of roll presses, and granulation, as are described and defined below, are notable for their stability and rate of dissolution and for their low dust content even after repeated transportation and transfer of the drums or packs, it being possible to avoid the laborious mixing with water and evaporation required for fluidized-bed granules.

The invention relates to the compacted granular products, their production and their use.

The invention therefore firstly provides a compacted granulated product (G) of a mixture of
(A) at least one water-soluble dye,
(B) at least one extender, and
(C) at least one compound of formula

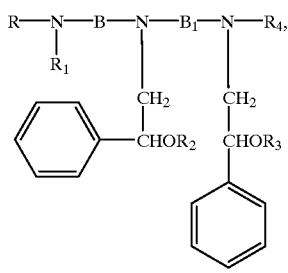

(1)

wherein
R is a saturated or unsaturated aliphatic residue with 12 to 22 carbon atoms,
$R_1$, $R_2$, $R_3$ and $R_4$ independently of one another are each hydrogen or a residue of formula —$(OCH_2CH_2)_nH$ in which n is a number from 20 to 100, and
B and $B_1$ independently of one another are each $C_1$–$C_4$alkylene, and optionally
(D) a dust-binding oil and/or
(E) further additives.

Compounds (C) of formula (1) preferably contain altogether 30 to 150, especially 30 to 120 mol ethyleneoxide.

As active substance, i.e. as component (A), in the granular product (G) of the invention it is possible to employ any desired water-soluble dyes, especially dyes which are soluble at room temperature (=20° C.) and in water to at least 1 g/l and are soluble to at least 5 g/l under application conditions.

The following dye groups may be mentioned in particular as (A):
(A1) anionic dyes containing at least one water-solubilizing anionic substituent, especially at least one sulphonic acid group or carboxylic acid group, preferably in salt form (alkali metal salt and/or ammonium salt), or at least one metal complex group or at least one thiolate or oxalate group. Such dyes are general knowledge in the art and are widely described in the technical literature, in particular as direct dyes, acid dyes, reactive dyes, mordant dyes, development dyes, vat dyes and sulphur dyes, e.g. the designations under which they appear in the Colour Index, $3^{rd}$ edition (3rd Revision 1987 inclusive Additions and Amendments up to No. 85), the water-soluble form of the vat dyes being the leuco form, and the water-soluble form of the sulphur dyes likewise being the leuco sulphur dye form or also the Bunte salt form. For the granulation of the invention particular preference is given among these to the direct dyes, the acid dyes and the reactive dyes (including metal complexes), which contain at least one, preferably two or more water-solubilizing substituents, especially sulpho groups, per molecule; some metal complex dyes are of sufficient solubility in water even without such substituents.
(A2) Water-soluble, nonionic dyes whose molecule contains water-solubilizing groups and substituents, principally carbamoyl groups and sulphamoyl groups, which may be substituted or unsubstituted.

Particular preference is given to the acid and metal complex dyes.

The dyes (A) can be employed in the form in which they have been prepared, following filtration and, if desired, washing of the filter cake and drying, or also as powders. The water-soluble dyes can if desired be purified or desalinated by membrane filtration, in the form of their salt-containing solutions and/or their solutions containing by-products, and in the form of the purified concentrated solutions can be combined with (B) and (C) and, if desired with (D) and/or (E), and then dried. If (A) is obtained in highly pure form and/or, if any by-products present and/or any salt content hailing from the preparation are not disruptive in the end product, the dyes (A)—directly in the solutions in which they have been formed or after dissolving the filter cake in water under suitable pH and temperature conditions—can be combined as required with (B) and (C) and, if desired, (D) and/or (E) and then dried. It is also possible to paste up the filter cake with a solution containing (B) and (C) and, if desired, (D) and/or (E) and then to dry the resulting aqueous mixture. Drying is preferably carried out first, in the presence or absence of (B) and/or (C), followed by mixing with the remaining components.

An addition of the dust-binding oil (D) during or before the drying process is advantageous and preferred.

As extender (B) come principally into consideration:
(B1) electrolytic extenders, in particular salts, principally alkali metal salts, magnesium salts and/or ammonium salts of mineral acids or low-molecular-mass aliphatic carboxylic acids (e.g. $C_{2-6}$), examples being chlorides, sulphates, carbonates or phosphates, preferably lithium, sodium or potassium chloride, magnesium chloride, sodium sulphate (e.g. as Glauber's salt), sodium or potassium carbonate, sodium or ammonium hexafluorosilicate and, especially as buffer substances, mono- or disodium phosphate and/or mono- or dipotassium phosphate;
(B2) non-electrolytic extenders, especially nonionic extenders, examples being oligo- or polysaccharides (e.g. dextrins), polyglycerols, polyvinyl alcohols, polyethylene glycols (Carbowaxes) having a molecular weight ≧300, especially in the range from 600 to 2000, polyvinylpyrrolidones and, optionally, urea.

Salts of type (B1) may (at least in part) already result from in the preparation of water-soluble dyes, especially sodium chloride and/or Glauber's salt, and/or can be added as extender components. Nonionic additives of type (B2) are particularly suitable when water-soluble dyes have been obtained in substantially salt-free form (for example, by membrane filtration or by acidification and/or extraction).

Depending on the desired concentration of water-soluble dye in (G), the content of (B) in (G) may vary. The weight ratio (B)/(A) is, for example, in the range from 1/100 to 9/1, especially from 1/50 to 5/1 and, preferably, in the range from 1/10 to 2/1.

Preferred as (C) are compounds of the formula

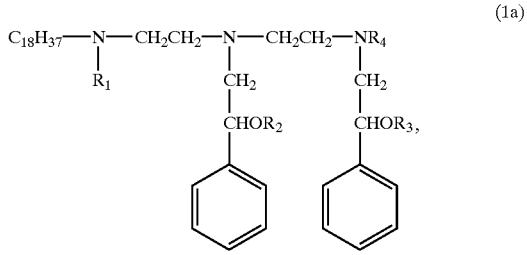

(1a)

wherein
R$_1$, R$_2$, R$_3$ and R$_4$ are as defined under the formula (1) and the sum of n is a number from 30 to 100, preferably from 30 to 70.

Especially preferred as (C) are compounds which are obtainable by reacting 1 mol stearyl-di-(phenylhydroxyethyl)-diethylenetriamine with 50 to 150 mol ethyleneoxide at about 120 to 160° C. in the presence of a catalyst. Useable catalysts are known from the prior art concerning reactions of ethyleneoxide with amines and/or aliphatic alcohols.

The amount of (C) in the compacted granular dye (G) is preferably in the range of 0,5 to 10% by weight, especially in the range of 1 to 5%.

Products suitable as (D) are viscous, water-soluble products, and oils which are not water-soluble per se, in the presence, for example, of appropriate emulsifiers. Particularly suitable as (D) are:

(D1) low-molecular-mass polyols, e.g. diols or triols, in particular having 2 to 6 carbon atoms, or their mono-lower-alkyl ethers, e.g. glycerol, C$_{2-6}$ alkylene glycols, oligo-(C$_{2-4}$ alkylene) glycol ethers and C$_{1-4}$-alkyl monoethers thereof, preferably mono- or dipropylene glycol monomethyl ether;

(D2) polyethylene glycols having an average molecular weight ≧150, for example in the range from 150 to 900, with preference being given to the liquid grades, especially those with an average molecular weight in the range from 170 to 600;

(D3) hydrophobic oils, which may be combined, for example, with an emulsifying surfactant system, examples being hydrocarbon oils (primarily aliphatic and/or araliphatic oils, e.g. paraffin oil, mineral oil and/or phenylalkanes) in combination with emulsifying surfactants, for example the above mentioned surfactants, examples being fatty acids and/or soaps; triglycerides, which may have been hydrogenated, e.g. palm oil, castor oil or coconut oil and may likewise be combined with surfactants as set out above, or also fatliquoring oils, as are otherwise used for the fatliquoring of leather, and which may have been at least partly modified for emulsifiability by, for example, hydrolysis, transesterification and/or introduction of sulpho groups (by sulphation, sulphitation or sulphonation).

The products (D1) and (D2) are in general water-soluble. The products (D3) are advantageously combined with sufficient surfactant, or hydrophilically modified to such a degree, that they are self-emulsifiable in water. To emulsify the hydrophobic oils the corresponding emulsifiers are employed in effective amounts, suitably in amounts which are sufficient for the respective oils to be emulsified by simply pouring the oil/emulsifier mixture into water, and/or at least in amounts such that the oils adhere to the dry granules without smearing, i.e. act as interface-active agents between the oily Phase and the solid Phase (granule). Surfactants advantageously employed are those as set out below under (EA). Their quantitative ratio to the oils is, for example, in the range from 0.01/1 to 1 /1, advantageously from 0.02/1 to 0.5/1 and, preferably, from 0.03/1 to 0.2/1. In another embodiment of the invention, the oils (D3) are not combined with surfactants.

If a surfactant-containing oil (D3) is employed as (D) it is possible, if desired, to add at least some of the surfactants (EA) in the form of (D). If desired, all of the surfactant (EA) can be added in the form of (D3).

In one embodiment of the invention the substance employed as (B) comprises those mixtures (D3) in which the oil is a hydrocarbon oil or a mixture of hydrocarbon oils which also has a foam-inhibiting effect, so that it may be possible to omit any separate addition of a defoamer as (EA1).

The dust-binding additives (D) are judiciously employed in an effective amount. The granular products (G) contains, for example, from 0.05 to 10 percent by weight of (D), advantageously from 0. 1 to 6% by weight of (D) and, preferably, from 0. 1 to 3% by weight of g (D).

Among the further additives (E) are hydrophilic surfactans (EA) preferred.

Suitable surfactants (EA) are those in which the hydrophilic character is predominant and which are at least colloidally soluble in water, especially those which act as wetting agents. The ionicity of the surfactants is arbitrary; in particular (EA1) non-ionogenic surfactants, especially adducts of ethylene oxide and, if desired, propylene oxide with aromatic and/or aliphatic hydroxy, carboxy or carbamoyl compounds which contain at least one lipophilic hydrocarbon radical, the lipophilic radicals being, for example, aliphatic radicals having 9 to 24, preferably 12 to 20 carbon atoms, as are derived, for example, from corresponding fatty acids, or being alkyl-substituted phenyl radicals which as substituents carry one or two alkyl radicals having a total of 4 to 18 carbon atoms, especially one or two C$_{4-9}$-alkyl radicals or one C$_{8-12}$-alkyl radical, as are derived from corresponding alkyl-substituted phenols, or styrylphenol. Mention may be made in particular of adducts of ethylene oxide and, if desired, propylene oxide with fatty alcohols, alkylphenols, fatty acids, fatty acid amides, fatty acid diethanolamides or diisopropanolamides, fatty acid mono- or diglycerides, sorbitan mono- or di-fatty-acid esters or castor oil. The number of moles of ethylene oxide per mole of hydroxy compound is suitably chosen such that the resulting surfactant is markedly hydrophilic in nature, preferably with an HLB≧7, for example in the range from 7 to 16, preferably from 8 to 14. If adduct formation takes place with propylene oxide as well, its amount is judiciously chosen so as not to impair the hydrophilic nature of the surfactant, preferably such that the ethyleneoxy units predominate over the propyleneoxy units. Before all are preferred fatty acid polyglycolesters and adducts of ethylene oxide with fatty alcohols and alkylphenols.

(EA2) Anionactive surfactants, especially those which comprise at least one hydrophilic anionic group, for example a sulphonic acid or sulphuric ester group, a phosphonic acid or phosphoric ester group or a carboxylic acid group, and in which the lipophilic radicals contain, for example, 7 to 24 carbon atoms, or also derive from unsubstituted or substituted naphthalenesulphonic acids and/or benzene compounds. Examples which may be mentioned are as follows: alkylbenzenesulphonates, alkylphenol sulphates and mono- or dialkyl-substituted sulphosuccinates in which the alkyl radicals contain, for example, 1 to 18, preferably 1 to 12 carbon atoms, $C_{9-24}$alkanesulphonic acids, $C_{9-24}$ fatty alcohol sulphates, ligninsulphonates, sulphated castor oil, petroleum sulphonates, $C_{13-16}$ paraffin sulphonates, condensation products of formaldehyde with unsubstituted or mono- or di-$C_{1-4}$ alkyl-substituted naphthalenesulphonic acids and, optionally, phenols and/or sulphonated phenols, toluenes, diphenyl ether and/or ditolyl ether, fatty acids (soaps) or also sulphated, phosphated or carboxymethylated derivatives of non-ionogenic surfactants of the type (EA1). The anionic surfactants are preferably in the form of their alkali metal salts, magnesium salts or ammonium salts, most simply as sodium salts, potassium salts or ammonium salts.

(EA3) Cationactive surfactants, for example those which contain at least one lipophilic radical as defined above and at least one primary, secondary or tertiary basic amino group, which may be protonated, or a quaternary ammonium group.

Examples which may be mentioned are fatty amines or fatty aminoalkylamines, which following reaction with epichlorohydrin may have been alkylated with methyl, benzyl and/or ethyl, and/or may have been reacted with ethylene oxide and, if desired, propylene oxide, and which may have been quaternized; acylation products of alkylenediamines, dialkylenetriamines or trialkylenetetramines or of hydroxyalkylalkylenediamines which comprise at least one basic nitrogen and which may have been alkylated and/or reacted with ethylene oxide and, if desired, propylene oxide and which may have been quaternized; the alkylene chains between two nitrogen atoms contain, for example, 2 to 6 carbon atoms, preferably 2 or 3 carbon atoms, the hydroxyalkyl radicals are, for example, ethanol or isopropanol; acylation products of ethylenediamine, diethylenetriamine or ethylene-propylenetriamine can if desired be cyclized to the corresponding imidazolines, and the basic nitrogen of the imidazoline ring can, if desired, be quaternized.

Since dyes and surfactants of opposite ionicity may tend to precipitate each other, preferred combinations are between anionic dyes and anionic surfactants and/or non-ionogenic surfactants.

Optionally it is also possible to employ mixtures of non-ionogenic surfactants with anionactive surfactants.

The weight ratio of the surfactants (EA) to the dye (A) is, for example, in the range from 0.01/100 to 100/100, advantageously in the range from 0.05/100 to 50/100 and, preferably, in the range from 0.1/100 to 10/100.

As additives (E) come further into consideration other formulating additives (EB), in particular the commonly known substances as can be added, in particular, as preservatives, primarily for the formulations, or formulating assistants, primarily for stock solutions or baths, especially (EB1) fungicides, bactericides and/or defoamers,
(EB2) solubilizers and
(EB3) builders.

As fungicides and bactericides (EB1) come into consideration in general known products, e.g. commercially available products, which may be employed in the respective recommended concentrations. As defoamers (EB1) come also into consideration in general known products, e.g. commercially available products, which may be employed in the respective recommended concentrations.

As (EB2) come into consideration in General known products having solubilizer properties, including, for example, those specified under (D1).

As (EB3) come into consideration conventional complexing agents as can be used to bind ions which form hardness in water, and iron ions in aqueous baths, primarily aminopolycarboxylic acids, aminopolymethylenephosphonic acids or polymeric carboxylic acids, for example nitrilo-triacetic acid, ethylenediaminotetraacetic acid, diethylenetriamine-penta-acetic acid or -penta-methylenephosphonic acid, (co)poly(meth)acrylic acids and (meth)acrylic acid/maleic acid copolymers, which are employed advantageously in alkali metal salt form (preferably sodium salt form).

The components (EB) can be present in (G) in small amounts, as are customary for dye formulations, relative to (G), for example in the range from 0 to 10, primarily from 0 to 5 percent by weight. The content of preservative and defoamer (EB1) in (G) is, for example, in the range from 0 to 2 percent by weight; the content of solubilizer (EB2) in (G) is, for example, in the range from 0 to 5 percent by weight—if (EB2) are employed, from 0.2 to 2 percent by weight, based on (G), are preferably present; the weight ratio (EB2)/(A) in this case is advantageously in the range from 0.004/1 to 0.2/1; the content of (EB3) in (G) is, for example, in the range from 0 to 5% by weight.

Components (A), (B), (C) and (D) and if present (E) can be combined with one another in dissolved form and then dried prior to compaction (densification), or—preferably—components (C) can also be combined with dried (A) (B) and (D) or else mixed with a moist filter cake containing (A), (B) and (D) and then, if required, can he dried prior to compaction or densification. By dry product is meant herein, in general, a product which contains $\leq 15\%$ by weight, in particular $\leq 7\%$ by weight, of water which is not chemically bonded, i.e. water which can be removed by subsequent drying.

Component (D) is suitably added before or during the drying stage. Component (D) may also be additionally added after the compaction or after adjustment of the particle size.

The dry mixture of (A) with (B) and also, if added—at least in part—prior to compaction, (C) and, if desired, (D) and/or (E) can be compacted by means of conventional pressure compaction machines, examples being trace presses or, preferably, roll presses, where the dry product to be compacted is fed in advantageously by means of a worm (filling screw). It is particularly advantageous to use apparatus in which the material to be compacted is fed in by a worm between the press rolls, so that precompaction takes place in the worm and further compaction is carried out between the press rolls. The compacting action can be influenced by the nature and fitment of the apparatus, primarily by the nature of the rolls and, in particular, by the pressure between the rolls, and it is judicious to choose the appropriate rolls, preferably corrugated rolls, e.g. sheet—producing rolls with finely to coarsely corrugated roll surfaces (fine-corrugated rolls are preferred in accordance with the invention). The diameter of the rolls may vary depending on the size of the assembly, e.g. in the range of 12 cm to 1 m, it being mostly possible to achieve satisfactory yields already with rolls of a diameter in the range of 12 to 50 cm, e.g. with rolls of a diameter preferably in the range from 12 to 30 cm, especially 25 cm, or even higher, in particular 35 cm. The roll pressure in the press-roll devices is advantageously >0.4 t/cmRL and can vary widely e.g. in the range from 0.4 to 18 t/cmRL (t/cmRL=tonnes per cm of roll length), for a roll diameter of 152 mm, the roll pressure changing in proportion to the roll diameter in accordance with the equation $$p_1/p_2 = k \cdot d_1/d_2$$

in which $d_1$ is the diameter of the roll 1, $d_2$ is the diameter of the roll 2, k is a constant typical for the system, $p_1$ is the roll pressure for the roll 1, and $p_2$ is the corresponding roll pressure for the roll 2.

The constant k is in general ca.=1 or deviates little from 1. Mostly k=1 can be taken for calculation.

For the preparation of the granular compacts (G) of the invention, preference is given to roll pressures (referred to a roll diameter of 152 cm) <9 t/cmRL, in particular $\leq 6$ t/cmRL. It is advantageous to operate with a roll pressure $\geq 0.6$ t/cmRL, preferably in the range from 0.6 to 3 t/cmRL (referred to a roll diameter of 152 cm), it being possible to produce granular products (G) of outstanding quality already at roll pressures $\leq 2$ t/cmRL. In an advantageous procedure the density of the compacted product (slug or sheet density) is as high as possible, especially $\geq 1$ g/cm$^3$.

Compaction takes place advantageously without external supply of heat except, if appropriate, for the endogenous heat generated by the pressure of compaction; this may give rise to a temperature increase of up to 30° C., for example, preferably $\leq 15°$ C.; compaction takes place advantageously at temperatures in the range from 15 to 60° C., preferably from 20 to 40° C. If desired it can be carried out under vacuum and/or with roll cooling.

The strand (from a stuffer) or sheet or slug (from press rolls) which result from compaction are then comminuted in an appropriate granulator, optionally after coarse fractionation of the strand or sheet (or slug), and the onsize (=granules of the desired particle size) is separated from any undersize and/or oversize (=granules with a particle size finer or coarser than the desired particle size); in particular, it is screened through 2 or more sieves to the desired onsize. The sieves (or sieve inserts) are chosen such that the particle size of the onsize is within the desired range, primarily in the range from 0. 1 to 3 mm, with any oversize retained in the first sieve being passed back for comminution and the undersize which has passed through the last sieve being passed back for (pre)compaction. The compacted granular products (G) of the invention are advantageously small- to medium-sized, preferably of a granule size <3 mm, e.g. <1.5. mm, and advantageously >0.3 mm, in particular in the range of 0.3 to 1.2 mm, preferably 0.3 to 1 mm, with particular preference 0.4 to 1 mm.

The granulators are advantageously chosen so as to give granules which do not exceed the maximum particle size.

Dry compaction/granulation can be carried out in known machines. Examples of suitable machines are compacting machines of Compactor series K ("Kompaktor Baureihe K") from BEPEX GmbH (Leingarten, Germany) or compacting/granulating machines of type WP 50175, WP 170V Pharma or WP 1501250 or WP 150/250V from ALEXANDER-WERK AG (Remscheid, Germany). The granulator may include, or be followed by, a System for removing fine dust. By removing fine dust which may form when slugs break and/or are granulated, it is possible to reduce the required or optimum amount of (D) to a minimum, e.g. $\leq 2\%$ by weight of (D) based on (G).

The resulting granular product (G) can be stored, for example, in a silo from which the respective containers for conveying the granules can then be filled, examples being drums (e.g. metal drums or containers made from cardboard or chipboard) or tanks (e.g. road tankers or Tanks suitable for rail Transport). By taking appropriate precautions, which are known per se, the entire process of compaction, granulation, recycling of undersize and, if present, oversize, etc., can be carried out substantially without dust, and in particular continuously, by conducting the process in appropriately sealed apparatus and using appropriatedust-collecting filters operating, for example, with reduced pressure.

The granular compacts (G) of the invention are notable for their low dust content and stability on transportation and storage, and feature an optimum, or sufficient, rate of dissolution, as is suitable for use in dyeing operations. They can be prepared very simply and economically and have the advantage that the particularly high bulk density of the product (e.g. >0.5 g/cm$^3$, especially 0.8 to 1.2 g/cm$^3$) entails a minimum of transport and storage volume. There may be produced granular compacts (G) of particularly high bulk density, e.g. distinctly higher than 0.5 g/cm$^3$, in particular distinctly higher than 0.55 g/cm$^3$ e.g. up to 1.2 g/cm$^3$, principally in the range of 0.7 to 1.2 g/cm$^3$, preferably 0.8 to 1 g/cm$^3$. Of particular relevance is the possibility of producing granular products (G) the bulk density of which is e.g. above 0.7 g/cm$^3$, advantageously above 0.8 g/cm$^3$.

The products (G) are notable for their low dust content and their free-flowability, even after prolonged storage, repeated transfer and/or transportation (shaking storage), which represents also a marked improvement in the meterability of the product.

The granular compacts (G) of the invention can be dissolved directly by pouring them into water, with stirring; their rate of dissolution is such that with gentle stirring they dissolve in water within a short period, better than the corresponding powder. They are also easier to wet, show practically no caking when scattered in and, consequently, offer better metering possibilities. The preferred small-size particle granular products of the invention, especially those with a particle size scatter over the entire range from 0.3 to 1 mm, especially also 0.4 to 1.2 mm, exhibit an optimum combination of bulk density and rate of dissolution, so that when the product is poured onto the solution water the individual granules, directly or after a very brief period of floatation on the surface of the water, sink into the solution water and in doing so dissolve, with an optimum homogeneous solution of the dye being obtained very rapidly with gentle stirring. In this way it is possible with the minimum of effort and the maximum of effect to prepare stock solutions and reinforcing baths; it is also possible directly to prepare concentrated impregnating baths and inks, and also printing pastes or even dyeing baths. For the dyeing of paper after sheet-formation, the dyes can likewise be added directly to the dyeing bath with an appropriate high rate of dissolution.

By the granulation of the invention the dyeing properties of the active substances (A) are practically not impaired, it being possible to operate in a substantially dust-free procedure, which is of particular value for the continued cleanliness of the apparatus and immediate surroundings, and permits the dyer to work in an environment which is practically free from dye dust using relatively small volumes of dry dye.

In the following examples parts and percentages are by weight; the temperatures are indicated in degrees Celsius. The compacting/granutating machines are those from the company ALEXANDERWERK AG (Remscheid, Gennany). "C.I." stands for "Colour Index"; "kN/cmRL" stands for "kilonewtons per cm of roll length" and "rpm" stands for "revolutions per minute".

EXAMPLE 1

100 parts by weight of the commercial powdery dye formulation (A100) containing
48.50 percent by weight sodium sulphate,
5.00 percent by weight ammonium-hexafluorosilicate,
10.00 percent by weight tetrasodium-pyrophosphate,
12.60 percent by weight of a dye of formula:

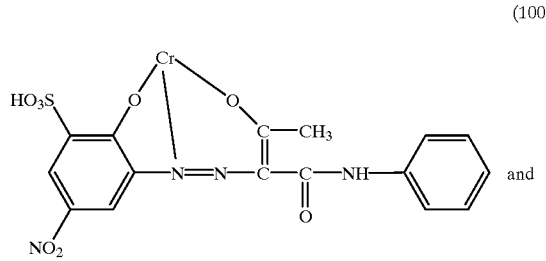

(100)

23.90 percent by weight of a dye of formula:

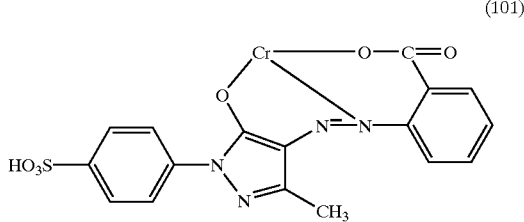

(101)

are mixed thoroughly with
0.5 parts by weight of a compound of formula (1a) which is obtained by reacting 1 mol stearyl-di-(phenylhydroxyethyl)-diethylenetriamine with about 100 mol ethyleneoxide at about 140° C. in the presence of sodium-methylate. and
1.0 parts by weight water, and the resulting mixture is compacted in a compacting/granulating machine WP 50/75 (roll lenght 75 mm, roll diameter 152 mm) at a roll pressure of 16.0 kN/cm RL and a rotary speed of 8 rpm to give a slug 2.0 mm thick, and this slug is granulated to give small particulare granules (from 0.3 to 1 mm particle size). The roll throughput is 31 kg/h, the output of onsize 23 kg/h and the proportion of undersize 25.8%. The undersize is passed back for compaction.

The resulting compacted granular dye is readily soluble in water and notable for its low dust content, stability on storage and transportation, and speed dissolution.

EXAMPLE 2

The procedure is as in Example 1 except that instead 100 parts by weight of the commercial powdery dye formulation (A100) 100 parts by weight of the commercial powdery dye formulation (A101) containing
35.91 percent by weight of a dye of formula:

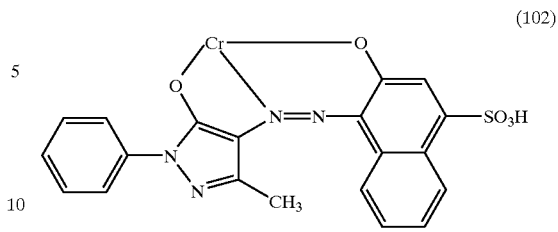

(102)

60.65 percent by weight sodium sulphate
1.80 percent by weight sodium carbonate
1.42 percent by weight paraffin oil,
0.20 percent by weight oleyl-polyglycolether 8 and
0.02 percent by weight water,
are mixed thoroughly with
1.0 parts by weight of a compound of formula (1 a) wherein R is $C_{18}H_{37}$ and the sum of n is between 99 and 114 and
1.0 parts by weight water.

EXAMPLE 3

The procedure is as in Example 1 except that instead 100 parts by weight of the commercial powdery dye formulation (A100) 100 parts by weight of the commercial powdery dye formulation (A102) containing
71.70 percent by weight of a dye of formula:

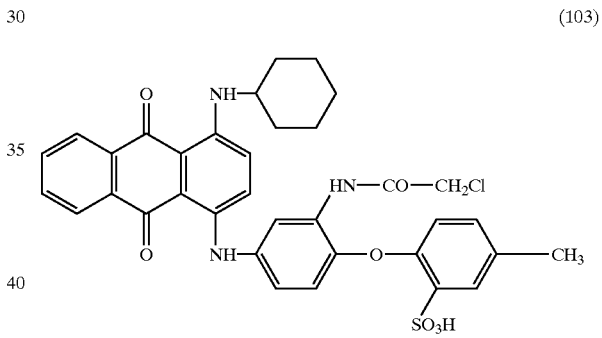

(103)

12.80 percent by weight ®Tamol NNOK Powder,
8.20 percent by weight cumol-4-sulphonic acid Na-salt,
1.73 percent by weight paraffin oil,
0.025 percent by weight oleyl-polyglycol ether 8 and
0.02 percent by weight water
are mixed thoroughly with
1.2 parts by weight of a compound of formula (1 a) as in Example 1
and 1.0 parts by weight water.

Analogously as with the compacting/granulating machine WP 50/75, the above described dye formulations can also be compacted and granulated with the compacting/granulating machine WP 250/150 from the company ALEXANDER-WERK AG (Remscheid, Gennany).

EXAMPLE 4

Using the procedure of Example 1 the following commercial dyestuffs are processed to give a granular dye which is readily soluble in water and notable for its low dust content, stability on storage and transportation, and speed dissolution:
NEOLAN® Black P, NEOLAN® Blue P, NEOLAN® Blue PA, NEOLAN® Navy P, NEOLAN® Red P, NEOLAN® Yellow P, LANASET® Black B, LANASET® Blue 2R, LANASET® Blue 2RA, LANASET® Blue 5G, LANASET® Bordeaux B, LANASET® Brown B, LANASET® Brown G-01, LANASET® Green B, LANASET® Grey G, LANASET® Orange RN, LANASET® Navy R, LANASET® Red 2B, LANASET® Red G, LANASET® Red 2GA-01, LANASET® Violet B, LANASET® Yellow 2R, LANASET® Yellow 4GN.

What is claimed is:

1. A compacted granular product (G), having a bulk density of >0.5 g/cm$^3$, comprising a mixture of
   (A) at least one water-soluble dye,
   (B) at least one extender, and
   (C) 0.5 to 10% by weight of at least one compound of formula:

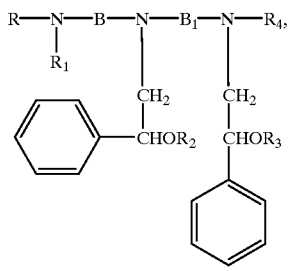

(1)

wherein
   R is a saturated or unsaturated aliphatic residue with 12 to 22 carbon atoms,
   $R_1$, $R_2$, $R_3$ and $R_4$ independently of one another are each hydrogen or a residue of formula —(OCH$_2$CH$_2$)$_n$H in which n is a number from 20 to 100, and
   B and $B_1$ independently of one another are each $C_1$–$C_4$alkylene, and optionally
   (D) a dust-binding oil and/or
   (E) further additives.

2. A compacted granular product (G) according to claim 1, wherein the compound (C) of formula (1) contains altogether 30 to 150 moles of ethylene oxide.

3. A compacted granular product (G) according to claim 2, wherein the compound (C) of formula (1) contains altogether 30 to 120 moles of ethylene oxide.

4. A compacted granular product (G) according to claim 1, containing a compound (C) of the formula:

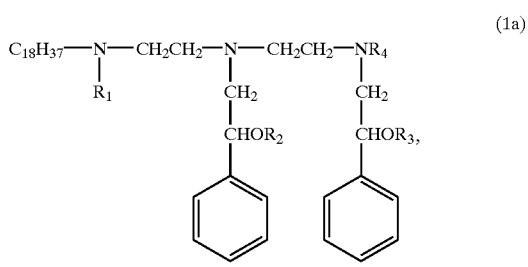

(1a)

wherein
   $R_1$, $R_2$, $R_3$ and $R_4$ are as defined under the formula (1) in claim 1, and the sum of n is a number from 30 to 100.

5. A compacted granular product (G) according to claim 4, wherein the sum of n is a number from 30 to 70.

6. A compacted granular product (G) according to claim 1, containing a compound (C) which is obtainable by reacting 1 mol of stearyl-di-(phenylhydroxyethyl)-diethylenetriamine with 50 to 150 moles of ethylene oxide at about 120 to 160° C. in the presence of a catalyst.

7. A compacted granular product (G) according to claim 1 containing 1 to 5% by weight of compound (C) with respect to the total weight of (G).

8. A compacted granular product (G) according to claim 1 containing a dust-binding oil as component (D).

9. A compacted granular product (G) according to claim 1 having a particle size in the range from 0.1 to 3 mm.

10. A process for the production of a compacted granular product (G) according to claim 1, wherein an uncompacted mixture consisting of (A), (B), (C) and (D) and, optionally (E), is compacted and granulated.

11. A process for the dyeing of substrates which can be dyed with a water-soluble dye (A), wherein (A) is employed in the form of an (A)-containing compacted granular product (G) according to claim 1.

12. A process for the dyeing of substrates which can be dyed with a water-soluble dye (A), wherein (A) is employed in the form of an (A)-containing compacted granular product (G) according to claim 4.

* * * * *

UNITED STATES PATENT AND TRADEMARK OFFICE
CERTIFICATE OF CORRECTION

PATENT NO.    : 6,632,255 B2
DATED         : October 14, 2003
INVENTOR(S)   : Walter Dumber et al.

It is certified that error appears in the above-identified patent and that said Letters Patent is hereby corrected as shown below:

<u>Title page,</u>
Item [30] should read:
-- [30]         Foreign Application Priority Data
   Aug. 21, 2000 [EPO]              00810743.5 --.

Signed and Sealed this

Seventeenth Day of February, 2004

JON W. DUDAS
*Acting Director of the United States Patent and Trademark Office*